United States Patent
Müller et al.

(10) Patent No.: US 8,759,445 B2
(45) Date of Patent: Jun. 24, 2014

(54) STYRENE BUTADIENE BLOCK COPOLYMER MIXTURES FOR SHRINK-WRAP FILMS

(75) Inventors: Matthias Müller, Pfungstadt (DE); Konrad Knoll, Mannheim (DE); Christof Mehler, Dossenheim (DE); Helmut Steininger, Worms (DE); Norbert Güntherberg, Speyer (DE); Daniel Wagner, Bad Dürkheim (DE); Michael Schuster, Erpolzheim (DE); Geert Verlinden, Stekene (BE); Florian Greger, Ellerstadt (DE)

(73) Assignee: Styrolution GmbH (DE)

( * ) Notice: Subject to any disclaimer, the term of this patent is extended or adjusted under 35 U.S.C. 154(b) by 536 days.

(21) Appl. No.: 13/000,817

(22) PCT Filed: Jun. 23, 2009

(86) PCT No.: PCT/EP2009/057771
§ 371 (c)(1),
(2), (4) Date: Dec. 22, 2010

(87) PCT Pub. No.: WO2009/156378
PCT Pub. Date: Dec. 30, 2009

(65) Prior Publication Data
US 2011/0098401 A1    Apr. 28, 2011

(30) Foreign Application Priority Data
Jun. 27, 2008 (EP) .................................. 08159247

(51) Int. Cl.
*C08L 53/02* (2006.01)
*C08F 297/04* (2006.01)

(52) U.S. Cl.
USPC ........................................................... 525/89

(58) Field of Classification Search
USPC ................ 525/432, 89; 528/310, 322, 496
See application file for complete search history.

(56) References Cited

U.S. PATENT DOCUMENTS

| | | | |
|---|---|---|---|
| 4,386,125 A | 5/1983 | Shiraki et al. | |
| 6,521,712 B1 | 2/2003 | Knoll et al. | |
| 6,593,430 B1 | 7/2003 | Knoll et al. | |
| 7,037,980 B2 | 5/2006 | Stacy et al. | |
| 2008/0269414 A1* | 10/2008 | Knoll et al. .................. | 525/89 |

FOREIGN PATENT DOCUMENTS

| | | |
|---|---|---|
| EP | 0 058 952 | 9/1982 |
| EP | 0 436 225 | 7/1991 |
| EP | 0 852 240 | 7/1998 |
| EP | 1 498 438 | 1/2005 |
| WO | WO-00/58380 A1 | 10/2000 |
| WO | WO03/091303 * | 11/2003 |
| WO | WO2005/074819 * | 7/2006 |
| WO | WO-2006/074819 A1 | 7/2006 |
| WO | WO-2008/141941 | 11/2008 |
| WO | WO-2009/037115 | 3/2009 |
| WO | WO-2009/062927 | 5/2009 |
| WO | WO-2009/080464 | 7/2009 |
| WO | WO-2009/103714 | 8/2009 |
| WO | WO-2009/109593 | 9/2009 |
| WO | WO-2009/112549 | 9/2009 |
| WO | WO-2009/156378 | 12/2009 |

OTHER PUBLICATIONS

International Preliminary Report on Patentability issued in related International Application No. PCT/EP2009/057771 on Apr. 6, 2010. English language translation of the International Preliminary Report on Patentability issued in related International Application No. PCT/EP2009/057771 on Mar. 14, 2011.

* cited by examiner

*Primary Examiner* — Jeffrey Mullis
(74) *Attorney, Agent, or Firm* — Drinker Biddle & Reath LLP

(57) ABSTRACT

A mixture which comprises
a) from 5 to 95% by weight of a copolymer A which comprises one or more copolymer blocks $(B/S)_A$ each composed of from 65 to 95% by weight of vinylaromatic monomers and from 35 to 5% by weight of dienes and of a glass transition temperature $Tg_A$ in the range from 40° to 90° C.,
b) from 95 to 5% by weight of a block copolymer B which comprises at least one hard block S composed of from 95 to 100% by weight of vinylaromatic monomers and of from 0 to 5 by weight of dienes, and comprises one or more copolymer blocks $(B/S)_A$ each composed of from 65 to 95% by weight of vinylaromatic monomers and of from 35 to 5% by weight of dienes and of a glass transition temperature $Tg_A$ in the range from 40° to 90° C., and comprises one or more copolymer blocks $(B/S)_B$ each composed of from 20 to 60% by weight of vinylaromatic monomers and of from 80 to 40% by weight of dienes and of a glass transition temperature $Tg_B$ in the range from −70° to 0° C.,
c) from 0 to 45% by weight of thermoplastic polymers C other than A and B, and
d) from 0 to 6% by weight of processing aids D,
where the entirety of A to D gives 100% by weight, and its use for the production of shrink films.

20 Claims, No Drawings

STYRENE BUTADIENE BLOCK COPOLYMER MIXTURES FOR SHRINK-WRAP FILMS

CROSS REFERENCE TO RELATED APPLICATIONS

This application is a national stage application under 35 U.S.C. §371 of PCT/EP2009/057771, filed Jun. 23, 2009, which claims benefit to European application 08159247.9, filed Jun. 27, 2008, the entire disclosures of which are hereby incorporated by reference.

The invention relates to a mixture which comprises
a) from 5 to 95% by weight of a copolymer A which comprises one or more copolymer blocks $(B/S)_A$ each composed of from 65 to 95% by weight of vinylaromatic monomers and from 35 to 5% by weight of dienes and of a glass transition temperature $Tg_A$, in the range from 40° to 90° C.,
b) from 95 to 5% by weight of a block copolymer B which comprises at least one hard block S composed of from 95 to 100% by weight of vinylaromatic monomers and of from 0 to 5% by weight of dienes, and comprises one or more copolymer blocks $(B/S)_A$ each composed of from 65 to 95% by weight of vinylaromatic monomers and of from 35 to 5% by weight of dienes and of a glass transition temperature $Tg_A$ in the range from 40° to 90° C., and comprises one or more copolymer blocks $(B/S)_B$ each composed of from 20 to 60% by weight of vinylaromatic monomers and of from 80 to 40% by weight of dienes and of a glass transition temperature $Tg_B$ in the range from -70° to 0° C.,
c) from 0 to 45% by weight of thermoplastic polymers C other than A and B, and
d) from 0 to 6% by weight of processing aids D,
where the entirety of A to D gives 100% by weight, and to its use for the production of shrink films.

The use of styrene-butadiene block copolymers as heat-shrinkable films has been disclosed by way of example in EP-A 058 952 or EP-A 436 225. The films are stretched to over 500% by heating at from 60 to 100° C., and the stretched state is set after cooling to room temperature. After printing, these can be processed to give pods and by way of example placed over a bottle and reshrunk in a heat tunnel at from about 70 to 90° C., whereupon the film clings to the bottle.

Shrink films are intended to shrink almost to their initial dimensions when applied under hot conditions, but at the same time are intended to have high storage stability, meaning that they are intended to exhibit no shrinkage at temperatures around 20-40° C. Furthermore, they are intended not only to have high transparency but also to have high stiffness and strength.

EP-A 852240 describes styrene-butadiene block copolymers which after orientation in hot conditions, are claimed to have a reduced level of spontaneous shrinkage at 30° C.

U.S. Pat. No. 7,037,980 describes star-shaped butadiene-styrene block copolymers having random styrene-butadiene blocks which, when compared with pure styrene blocks of identical molecular weight, exhibit a reduced glass transition temperature and thus improved shrinkage behavior on exposure to heat.

WO 2006/074819 describes styrene-butadiene block copolymer mixtures which can be processed to give storage-stable, heat-shrinkable films with high shrinkage capability and with high stiffness/strength. The films have high transparency, even after stretching and shrinking.

It was an object of the invention to find styrene-butadiene block copolymer mixtures which have not only high stiffness/strength and transparency but also high shrinkage capability at application temperatures in the region of 90° C., and which simultaneously exhibit a reduced level of spontaneous shrinkage behavior, also termed "natural shrinkage", on storage lasting from a number of days up to 3 weeks in the range from 0 to 40° C.

The abovementioned mixture of block copolymers has accordingly been found.

The mixture preferably comprises from 30 to 50% by weight of the copolymer A, from 70 to 50% by weight of the block copolymer B, and from 0 to 20% by weight of thermoplastic polymers C other than A and B.

The mixture can comprise, alongside the polymers A, B, and, if appropriate, C, from 0 to 6% by weight of conventional processing aids D, such as stabilizers, antiblocking agents, dyes, UV absorbers, etc., and plasticizers. Plasticizers that can be used are from 0 to 6% by weight, preferably from 1 to 4% by weight, of a homogeneously miscible oil or oil mixture, in particular white oil or dioctyl adipate, or a mixture of these. Particularly good shrinkage values are obtained if the content of white oil in the mixture is from 1.5 to 3.5% by weight, based on the entire mixture.

Copolymer A:

The mixture comprises from 5 to 95% by weight, preferably from 30 to 50% by weight, particularly preferably from 35 to 45% by weight, of a copolymer A, which comprises one or more copolymer blocks $(B/S)_A$ each composed of from 65 to 95% by weight of vinylaromatic monomers and from 35 to 5% by weight of dienes and of a glass transition temperature $Tg_A$ in the range from 40° to 90° C.

It is preferable that the copolymer A is composed of a copolymer $(B/S)_A$ which is composed of from 85 to 93% by weight of a vinylaromatic monomer, in particular styrene, and from 7 to 15% by weight of a diene, in particular isoprene or butadiene. Particular preference is given to butadiene.

The glass transition temperature of the copolymer block $(B/S)_A$ is preferably in the range from 50 to 80° C., particularly preferably from 60 to 75° C. The glass transition temperature is affected by the nature, constitution, and distribution of the monomers, and can be determined by differential scanning calorimetry (DSC) or differential mechanical thermal analysis (DMTA), or, if the distribution of the monomers is random, from the Fox equation. Precise DSC determination is usually based on ISO 11357-2, with evaluation of the 2nd cycle with a heating rate of 20 K/min.

Preference is given to copolymers A which comprise one or more copolymer blocks $(B/S)_A$ composed of vinylaromatic monomers and of dienes, with random distribution. These can by way of example be obtained by anionic polymerization using alkyllithium compounds in the presence of randomizers, such as tetrahydrofuran, or potassium salts. Preference is given to use of potassium salts where the molar ratio of anionic initiator to potassium salt is in the range from 25:1 to 60:1, particularly preferably from 30:1 to 40:1. This method can at the same time achieve a low proportion of 1,2 linkages of the butadiene units. Suitable potassium salts are K alcoholates, in particular those soluble in the polymerization solvent, e.g. tert-amyl alcoholate or triethylcarbinolate, or other C-rich tertiary alcoholates.

The proportion of 1,2 linkages of the butadiene units is preferably in the range from 8 to 15%, based on the entirety of the 1,2, 1,4-cis, and 1,4-trans linkages.

It is particularly preferable that the copolymer A is composed of a single copolymer block $(B/S)_A$ or has linear block-copolymer structures, such as S-$(B/S)_A$ or S-$(B/S)_A$-S, where in each case S is a hard block composed of vinylaromatic monomers. It is also possible to use star polymers $[(B/S)_A]_n$ having n star branches, these being obtainable via coupling using an n-functional coupling agent or via initiation using an n-functional initiator. An example of a suitable coupling agent is epoxidized vegetable oil, such as epoxidized linseed or soybean oil. In this instance the product is stars having from 3 to 5 branches. Star block copolymers $[S-(B/S)_A]_n$ are likewise preferred.

However, random polymers $(B/S)_A$ can also be prepared via free-radical polymerization.

The weight-average molecular weight $M_W$ of the copolymer block $(B/S)_A$ is generally in the range from 50 000 to 500 000, preferably in the range from 80 000 to 400 000, particularly preferably in the range from 150 000 to 300 000. The weight-average molecular weight $M_W$ for each block S of the structures such as $S-(B/S)_A$ or $S-(B/S)_A-S$ is preferably in the range from 15 000 to 45 000. The blocks S are preferably composed of styrene units. In the case of the polymers prepared anionically, molecular weight is controlled by way of the ratio of amount of monomer to amount of initiator. However, initiator can also be added repeatedly after monomer feed has taken place, the result then being a bi- or multimodal distribution. In the case of polymers prepared by a free-radical route, $M_W$ is set by way of the polymerization temperature and/or addition of regulators. The molecular weights are usually determined by means of gel permeation chromatography (GPC) in THF as solvent, using polystyrene as standard. In the case of anionic polymerization. weight-average molecular weight is approximately identical with number-average molecular weight.

Block copolymer B

The mixture of the invention comprises from 95 to 5% by weight of a block copolymer B which comprises at least one hard block S composed of from 95 to 100% by weight of vinylaromatic monomers and of from 0 to 5% by weight of dienes, and comprises one or more copolymer blocks $(B/S)_A$ each composed of from 65 to 95% by weight of vinylaromatic monomers and of from 35 to 5% by weight of dienes and of a glass transition temperature $Tg_A$ in the range from 40° C. to 90° C., and comprises one or more copolymer blocks $(B/S)_B$ each composed of from 20 to 60% by weight of vinylaromatic monomers and of from 80 to 40% by weight of dienes and of a glass transition temperature $Tg_B$ in the range from –80° to 0° C., preferably in the range from –70° C. to –20° C., particularly preferably from –70 to –40° C.

Particularly suitable block copolymers B are rigid block copolymers which are composed of from 60 to 90% by weight, preferably from 65 to 75% by weight, of vinylaromatic monomers, in particular styrene, and of from 10 to 40% by weight, preferably from 25 to 35% by weight, of diene, in particular butadiene, based in each case on the entire block copolymer.

The block copolymer B of the mixture of the invention therefore has at least one copolymer block $(B/S)_A$ acting as hard block, and at least one block $(B/S)_B$ acting as soft block. The constitution and properties of the copolymer block $(B/S)_A$ correspond to those of the copolymer block $(B/S)_A$ described above for the copolymer A.

The number-average molar mass of the copolymer blocks $(B/S)_B$ of the block copolymer B is preferably in the range from 10 000 to 40 000 g/mol, particularly preferably from 20 000 to 30 000 g/mol.

The number-average molar mass $M_n$ of the hard blocks S of the block copolymer B is in the range from 5000 to 30 000 g/mol. The blocks can occur either terminally ($S_e$) or else between ($S_i$) the copolymer blocks $(B/S)_A$ and $(B/S)_B$. The short $S_i$ block maximizes incompatibility with the copolymer block $(B/S)_B$ acting as soft phase. This means that the intermediate phase that forms between the hard phase and the soft phase in the solid can be kept small. The proportion by weight of phases that soften in the region of room temperature. i.e. from 10 to 40° C., can thus be kept small. The molecular weights are usually determined by means of gel permeation chromatography (GPC) in THF as solvent, using polystyrene as standard.

Preferred block copolymers B are therefore star-shaped block copolymers B in which the stars in essence have short branches of structure $S_e-(B/S)_B$ and long branches of structure $(B/S)_A-S_i-(B/S)_B$, linked by way of the soft blocks $(B/S)_B$. Prior to linkage, a short polystyrene block whose number-average molar mass $M_n$ is smaller than 2500 g/mol can optionally be incorporated to improve toughness/stiffness ratio. When these star-shaped block copolymers are prepared by the preferred sequential anionic polymerization method using double initiation, the blocks $S_e$ and $S_i$ have the same constitution and number-average molar masses Mn.

The distribution of the vinylaromatic monomers and dienes in the copolymer blocks $(B/S)_B$ of the block copolymer B is preferably random.

Preferred block copolymers B have a star-shaped structure having terminal hard blocks $S_i$ and $(B/S)_B$. The proportion of the entirety of all of the hard blocks S and $(B/S)_B$ in the block copolymer B, based on the entire block copolymer B, is preferably at least 40% by weight, in particular from 50 to 70% by weight, particularly preferably from 57 to 67% by weight.

Thermoplastic Polymers C

The mixture of the invention comprises, as thermoplastic polymers C, from 0 to 45% by weight, preferably from 1 to 30% by weight, particularly preferably from 5 to 20% by weight, of a thermoplastic polymer or polymer mixture other than A and B.

Particularly suitable thermoplastic polymers C are styrene polymers, such as standard polystyrene (GPPS) or impact-resistant polystyrene (HIPS), styrene-acrylonitrile copolymers (SAN), styrene-methyl methacrylate copolymers (S/MMA) or polymethacrylates, such as PMMA, polyesters, such as polyethylene terephthalate (PET), polyolefins, such as polyethylene or polypropylene, or polyvinyl chloride (PVC), or semicrystalline materials. It is also possible to use polyacrylates, such as PnBA, and other acrylate rubbers, ethylvinyl acetate polymers (EVA), etc. The thermoplastic polymers C can be admixed to improve stiffness, solvent resistance, printability, antiblocking properties, recyclability, and cling properties.

It is also possible to use thermoplastic elastomers (TPE), for example linear or star-shaped, hydrogenated or non-hydrogenated styrene-butadiene or styrene-isoprene block copolymers other than A and B, examples being two- and three-block copolymers. Suitable block copolymers are available commercially as Kraton® D, Kraton® G or Styroflex®. Addition of thermoplastic elastomers generally improves the toughness of the mixture of the invention.

The mixtures of the invention are highly transparent and are particularly suitable for the production of shrink films. They are storage-stable, and exhibit very low shrinkage at from 0° C. to 40° C., even over a period of a number of weeks. The degree of shrinkage in the range from 90 to 100° C. is high, permitting flexible adaptation to processing conditions, and also the wrapping of highly convex shapes.

The mixture of the invention is also particularly suitable for the production of multilayer films via coextrusion. The abovementioned thermoplastic polymers C are likewise suitable for the various layers, and the mixture of the invention can be used here in the form of backing layers or in the form of external layers. The additional layers are in particular used for surface modification, antiblocking properties, higher stiffness, or modified/reduced permeability.

EXAMPLES

Block copolymer A

To prepare the linear styrene-butadiene block copolymer A of structure B/S, 2991 ml of cyclohexane were used as initial charge and titrated to the end point at 60° C. with 1.6 ml of sec-butyllithium (BuLi); 3.25 ml of a 1.4 M sec-butyllithium solution, for initiation, and 1.26 ml of a 0.1175 M potassium tert-amyl alcoholate (PTA) solution, as randomizer, were then admixed and the mixture was cooled to 40° C. The polymerization reaction was carried out in two portions. For this, 450 g of styrene and 50 g of butadiene were respectively twice added simultaneously, and the maximum temperature was restricted by countercooling to 75° C. The living polymer chains were then terminated by addition of 0.72 ml of isopropanol, the mixture was acidified with $CO_2$/water, and a stabilizer solution was added. A vacuum oven was used to evaporate the cyclohexane. The number-average molar mass $M_n$ determined by means of GPC was 220 000 g/mol. Block copolymer A comprises 5% by weight of white oil.

Comparative Example

A star-shaped block copolymer Comp 1 (26% by weight of butadiene, 74% by weight of styrene) having random copolymer blocks B/S was prepared by sequential anionic polymerization of styrene and butadiene and subsequent coupling using epoxidized linseed oil in accordance with example 15 of WO 00/58380.

Block Copolymer B1 to B12

The star-shaped block copolymers B1 to B12 were prepared in accordance with the data in table 2 by sequential anionic polymerization and subsequent addition of a coupling agent. 4785 ml of cyclohexane were used as initial charge and titrated to the end point at 60° C. with 1.6 ml of sec-butyllithium (BuLi), and cooled to 40° C. before adding 7.33 ml of a 1.4 M sec-butyllithium solution, (sec-BuLi 1) for initiation ($I_1$), and 4.1 ml of a 0.293 M potassium tert-amyl alcoholate (PTA) solution, as randomizer. To form the copolymer block $(B/S)_A$, the amounts stated in table 3 of styrene 1 and butadiene 1 were added. After the polymerization reaction had ended, a second amount of initiator $I_2$ of 18.33 ml of a 1.4 M sec-butyllithium solution (sec-BuLi 2) and, in succession, styrene 2 and a mixture of styrene 3 and butadiene 4 (copolymer block $(B/S)_B$), and also styrene 4, were added and polymerized. Finally, 5.6 ml of Edenol® D82 were added as coupling agent in cyclohexane and the mixture was terminated using 0.5 ml of isopropanol and acidified with $CO_2$/water, and a stabilizer solution (Irganox® 1010) was added. Table 2 collates the number-average molecular weights determined by means of GPC for the individual blocks in the block copolymers B2 to B13.

Block Copolymers B13 to B 25

The block copolymers B13 to B25 were prepared by analogy with the preceding examples, using the same starting materials, but with the difference that a 0.847 M solution was used. The amounts used are collated in tables 1 and 4. The number-average molecular weights determined by GPC (THF solvent, polystyrene standard) for the individual blocks in the block copolymers B13 to B25 are collated in table 2.

TABLE 1

| Ex. | sec-BuLi 1 ml [1.4M] | sec-BuLi 2 ml [1.4M] | Cyclohexane [ml] | PTA [ml] [0.847M] | Edenol D82 [ml] | isopropanol [ml] |
|---|---|---|---|---|---|---|
| 13 | 7.33 | 18.33 | 4785 | 2.07 | 5.6 | 0.56 |
| 14 | 5.60 | 16.80 | 5396 | 1.23 | 4.9 | 0.56 |
| 15 | 4.38 | 13.15 | 4856 | 0.94 | 3.87 | 0.5 |
| 16 | 4.48 | 13.44 | 4341 | 0.99 | 3.9 | 0.56 |
| 17 | 5.76 | 14.40 | 4857 | 1.11 | 4.41 | 0.5 |
| 18 | 5.54 | 16.63 | 4856 | 1.35 | 4.8 | 0.56 |
| 19 | 4.38 | 13.15 | 4856 | 0.94 | 3.87 | 0.5 |
| 20 | 4.48 | 13.44 | 4341 | 0.99 | 3.9 | 0.56 |
| 21 | 5.76 | 14.40 | 4857 | 1.11 | 4.41 | 0.5 |
| 22 | 4.90 | 12.24 | 4857 | 0.94 | 3.75 | 0.5 |
| 23 | 4.90 | 12.24 | 4857 | 0.94 | 3.75 | 0.5 |
| 24 | 4.03 | 12.10 | 4316 | 0.89 | 3.5 | 0.56 |
| 25 | 4.03 | 12.10 | 4316 | 0.89 | 3.5 | 0.56 |

TABLE 2

Number-average molecular weights of the individual blocks in the block copolymers B1 to B25

| Example | $M_n$ of $(B/S)_A$ (styrene 1/butadiene 1) | $M_n$ of S block (styrene 2) | $M_n$ of $(B/S)_B$ (styrene 3/butadiene 2) | Mw after coupling | D after coupling |
|---|---|---|---|---|---|
| B1 | 54355 | 13930 | 23570 | 168970 | 2.3 |
| B2 | 46493 | 15809 | 22454 | 157240 | 2.5 |
| B3 | 48247 | 22645 | 23228 | 197750 | 2.2 |
| B4 | 64538 | 16196 | 23082 | 191520 | 1.9 |
| B5 | 57541 | 18424 | 20357 | 162240 | 1.8 |
| B6 | 56050 | 17115 | 24180 | 175580 | 2.4 |
| B7 | 66540 | 16786 | 23023 | 191540 | 1.9 |
| B8 | 50609 | 19413 | 20786 | 152020 | 1.9 |
| B9 | 55961 | 11500 | 24856 | 175810 | 1.8 |
| B10 | 59263 | 19015 | 19913 | 161360 | 1.8 |
| B11 | 52178 | 15809 | 23325 | 176990 | 1.8 |
| B12 | 86508 | 14803 | 20236 | 198430 | 2.2 |
| B13 | 65851 | 14448 | 20122 | 267040 | 2.9 |
| B14 | 82254 | 16153 | 22648 | 248900 | 2.4 |
| B15 | 97694 | 24705 | 26529 | 236445 | 1.9 |
| B16 | 91439 | 12222 | 21072 | 224400 | 2.5 |
| B17 | 71312 | 15716 | 21753 | 230640 | 2.4 |
| B18 | 96890 | 16587 | 22626 | 191860 | 1.9 |
| B19 | 98871 | 26551 | 22508 | 212560 | 1.9 |
| B20 | 109317 | 25559 | 21884 | 239230 | 1.9 |
| B21 | 65178 | 15338 | 21327 | 211880 | 2.5 |
| B22 | 86418 | 19300 | 26742 | 301570 | 3.1 |
| B23 | 83223 | 18260 | 26284 | 241210 | 2.1 |
| B24 | 89322 | 17222 | 23861 | 281920 | 2.8 |
| B25 | 81432 | 15943 | 22965 | 224190 | 2.3 |

Mixtures M1 to M59

Each of the block copolymer mixtures was prepared by melting 40 parts by weight of the block copolymer A with 60 parts by weight of the block copolymers B1 to B13 in a counter-rotating twin-screw extruder at from 200 to 220° C., and was processed using a flat-film die to give films of thickness 1 mm.

Mechanical properties, such as modulus of elasticity and tensile strain at break, were determined longitudinally (in extrusion direction) and transversely (perpendicularly to extrusion direction) to ISO 527, and are stated in table 3.

The films were cut into strips of at least 10 cm length and 5 cm width and placed in the damping jaws of a tensile testing machine with a free clamped length of 5 cm. The strips were subjected to tensile strain at 80° C. in the tensile testing machine by a stretching factor of 5.5, and rapidly cooled in the stretched state to 23° C. To determine shrink properties, the width of the stretched strips was reduced to one third or they were cut into strips of width at least 1 cm. The narrow strips were used to determine the ultimate shrinkage values of table 5 after 10 sec in a waterbath at 90° C. To determine spontaneous shrinkage, the strips were stored for a period of 4, 14. and 21 days in an open, water-filled screw-top glass container in a waterbath controlled by a thermostat to 40° C.

Foils composed of the mixtures M1 to M59 of the invention exhibit distinctly less spontaneous shrinkage after 21 days of storage when compared with the comparative example. mixture Mcomp1.

TABLE 3

Feed sequence and constitution of the star-shaped block copolymers B1 to B12

|  | Styrene 1 [g] | Butadiene 1 [g] | Styrene 2 [g] | Styrene 3 [g] | Butadiene 2 [g] | Styrene 4 [g] | Initiator ratio | Butadiene content in $(B/S)_B$ [% by wt.] | Butadiene content [% by wt.] |
|---|---|---|---|---|---|---|---|---|---|
| B1 | 489.8 | 54.4 | 341.3 | 221.7 | 496.8 | 41.1 | 1:3.0 | 69.1 | 33.5 |
| B2 | 489.9 | 54.4 | 449.1 | 221.7 | 496.8 | 41.1 | 1:2.5 | 69.1 | 31.4 |
| B3 | 489.8 | 54.4 | 718.5 | 221.7 | 496.8 | 41.1 | 1:2.5 | 69.2 | 27.3 |
| B4 | 581.9 | 64.7 | 449.1 | 221.7 | 496.8 | 41.1 | 1:2.5 | 69.1 | 30.3 |
| B5 | 489.8 | 54.4 | 449.1 | 199.5 | 447.1 | 41.1 | 1:2.5 | 69.1 | 29.8 |
| B6 | 489.8 | 54.4 | 449.1 | 243.8 | 546.5 | 41.1 | 1:2.5 | 69.2 | 32.9 |
| B7 | 489.8 | 54.4 | 449.1 | 239.5 | 479 | 41.1 | 1:2.5 | 66.7 | 30.4 |
| B8 | 489.8 | 54.4 | 449.1 | 256.7 | 461.8 | 41.1 | 1:2.5 | 64.3 | 29.5 |
| B9 | 489.8 | 54.4 | 449.1 | 211.2 | 507.3 | 41.1 | 1:2.5 | 70.6 | 32.0 |
| B10 | 581.9 | 64.7 | 449.1 | 199.5 | 447.1 | 41.1 | 1:2.5 | 69.1 | 28.7 |
| B11 | 489.8 | 54.4 | 449.1 | 221.7 | 496.8 | 41.1 | 1:2.5 | 69.1 | 31.4 |
| B12 | 581.9 | 64.7 | 449.1 | 199.5 | 447.1 | 41.1 | 1:2.5 | 69.1 | 28.7 |

TABLE 4

Feed sequence and constitution of the star-shaped block copolymers B13 to B25

|  | Styrene 1 [g] | Butadiene 1 [g] | Styrene 2 [g] | Styrene 3 [g] | Butadiene 2 [g] | Styrene 4 [g] | Initiator ratio | Butadiene content in $(B/S)_B$ [% by wt.] | Butadiene content [% by wt.] |
|---|---|---|---|---|---|---|---|---|---|
| 13 | 581.9 | 64.7 | 449.1 | 199.6 | 447.1 | 41 | 1:2.5 | 69.1% | 28.7 |
| 14 | 611.5 | 67.9 | 454.7 | 196.4 | 437.1 | 36.1 | 1:3.0 | 69.0% | 28.0 |
| 15 | 550.4 | 61.1 | 409.2 | 176.8 | 393.4 | 32.5 | 1:3.0 | 69.0% | 28.0 |
| 16 | 562.6 | 62.5 | 290.4 | 157.1 | 349.7 | 28.9 | 1:3.0 | 69.0% | 28.4 |
| 17 | 550.4 | 61.1 | 409.2 | 176.8 | 393.4 | 32.5 | 1:2.5 | 69.0% | 28.0 |
| 18 | 550.4 | 61.1 | 409.2 | 176.8 | 393.4 | 32.5 | 1:3.0 | 69.0% | 28.0 |
| 19 | 550.4 | 61.1 | 409.2 | 176.8 | 393.4 | 32.5 | 1:3.0 | 69.0% | 28.0 |
| 20 | 562.6 | 62.5 | 290.4 | 157.1 | 349.7 | 28.9 | 1:3.0 | 69.0% | 28.4 |
| 21 | 550.4 | 61.1 | 409.2 | 176.8 | 393.4 | 32.5 | 1:2.5 | 69.0% | 28.0 |
| 22 | 550.4 | 61.1 | 409.2 | 176.8 | 393.4 | 32.5 | 1:2.5 | 69.0% | 28.0 |
| 23 | 550.4 | 61.1 | 409.2 | 176.8 | 393.4 | 32.5 | 1:2.5 | 69.0% | 28.0 |
| 24 | 489.2 | 53.8 | 363.8 | 157.4 | 349.7 | 28.9 | 1:3.0 | 69.0% | 28.0 |
| 25 | 489.2 | 53.8 | 363.8 | 157.4 | 349.7 | 28.9 | 1:3.0 | 69.0% | 28.0 |

TABLE 5

Properties of the polymer mixtures M1 to M59 and Mcomp1

| Mixture | Pts. of A/Pts. of B [Pts. By wt.] | Oil content [% by wt.] | Ultimate shrinkage, 90° C. [%] | Spontaneous shrinkage, 21 d [%] | in extrusion direction Modulus of elasticity [N/mm$^2$] | Tensile strain at break [%] | Perpendicularly to extrusion direction Modulus of elasticity [N/mm$^2$] | Tensile strain at break [%] |
|---|---|---|---|---|---|---|---|---|
| Mcomp1 | 40 A1/60 comp1 | 5.0 | 69 | 5.9 | 1358 | 358 | 700 | 352 |
| M1 | 40 A1/60 B1 | 2.0 | 69 | 2.9 | 540 | 370 | 341 | 385 |
| M2 | 40 A1/60 B2 | 2.0 | 69 | 2.8 | 942 | 340 | 594 | 361 |
| M3 | 40 A1/60 B3 | 2.0 | 72 | 4.0 | 1720 | 113 | 1569 | 90 |
| M4 | 40 A1/60 B4 | 2.0 | 69 | 3.4 | 1369 | 338 | 894 | 364 |
| M5 | 40 A1/60 B5 | 2.0 | 70 | 3.2 | 1180 | 339 | 863 | 352 |
| M6 | 40 A1/60 B6 | 2.0 | 70 | 3.4 | 1004 | 354 | 634 | 379 |
| M7 | 40 A1/60 B7 | 2.0 | 70 | 3.7 | 1199 | 327 | 589 | 357 |
| M8 | 40 A1/60 B8 | 2.0 | 70 | 3.7 | 1100 | 324 | 852 | 341 |
| M9 | 40 A1/60 B9 | 2.0 | 71 | 3.6 | 1386 | 350 | 720 | 366 |
| M10 | 40 A1/60 B10 | 2.0 | 70 | 3.1 | 1321 | 316 | 1252 | 356 |
| M11 | 40 A1/60 B11 | 2.0 | 69 | 3.3 | 1181 | 347 | 834 | 366 |
| M12 | 40 A1/60 B12 | 2.0 | 69 | 2.4 | 1490 | 255 | 1264 | 308 |
| M13 | 40 A1/60 B13 | 3.5 | 71 | 5.0 | 1286 | 36 | 1184 | 164 |

TABLE 5-continued

Properties of the polymer mixtures M1 to M59 and Mcomp1

| | Mixture | Oil | | | in extrusion direction | | Perpendicularly to extrusion direction | |
|---|---|---|---|---|---|---|---|---|
| | Pts. of A/Pts. of B [Pts. By wt.] | content [% by wt.] | Ultimate shrinkage, 90° C. [%] | Spontaneous shrinkage, 21 d [%] | Modulus of elasticity [N/mm²] | Tensile strain at break [%] | Modulus of elasticity [N/mm²] | Tensile strain at break [%] |
| M14 | 40 A1/60 B13 | 2.0 | 71 | 4.0 | 1314 | 149 | 1197 | 313 |
| M15 | 40 A1/60 B13 | 2.8 | 72 | 4.4 | 1394 | 78 | 1291 | 310 |
| M16 | 37 A1/60 B13 | 3.4 | 71 | 4.3 | 1327 | 80 | 1153 | 257 |
| M17 | 40 A1/60 B14 | 3.5 | 72 | 4.2 | 1403 | 56 | 1191 | 107 |
| M18 | 40 A1/60 B14 | 2.0 | 72 | 4.3 | 1532 | 189 | 1302 | 271 |
| M19 | 40 A1/60 B14 | 2.8 | 72 | 3.9 | 1508 | 28 | 1274 | 212 |
| M20 | 37 A1/63 B14 | 3.4 | 71 | 3.6 | 1441 | 95 | 1272 | 136 |
| M21 | 37 A1/63 B14 | 1.9 | 71 | 3.4 | 1449 | 244 | 1187 | 274 |
| M22 | 40 A1/60 B15 | 3.5 | 73 | 4.1 | 1574 | 46 | 1199 | 218 |
| M23 | 40 A1/60 B15 | 2.0 | 74 | 4.1 | 1574 | 161 | 1241 | 183 |
| M24 | 40 A1/60 B15 | 2.8 | 74 | 4.2 | 1581 | 138 | 1321 | 291 |
| M25 | 37 A1/63 B15 | 3.4 | 74 | 4.3 | 1510 | 119 | 1108 | 231 |
| M26 | 37 A1/63 B15 | 1.9 | 74 | 4.3 | 1596 | 261 | 1337 | 310 |
| M27 | 40 A1/60 B16 | 3.5 | 74 | 4.9 | 1451 | 57 | 985 | 228 |
| M28 | 40 A1/60 B16 | 2.0 | 73 | 4.2 | 1559 | 276 | 1123 | 289 |
| M29 | 40 A1/60 B16 | 2.8 | 72 | 3.8 | 1468 | 244 | 1003 | 166 |
| M30 | 37 A1/63 B16 | 3.4 | 72 | 4.2 | 1318 | 249 | 949 | 239 |
| M31 | 37 A1/63 B16 | 1.9 | 73 | 3.8 | 1436 | 275 | 1140 | 339 |
| M32 | 40 A1/60 B17 | 3.5 | 72 | 4.2 | 1388 | 24 | 1223 | 164 |
| M33 | 40 A1/60 B17 | 2.0 | 72 | 3.8 | 1456 | 183 | 1436 | 213 |
| M34 | 40 A1/60 B17 | 2.8 | 72 | 3.7 | 1533 | 91 | 1364 | 147 |
| M35 | 37 A1/63 B17 | 3.4 | 71 | 4.0 | 1466 | 10 | 1348 | 112 |
| M36 | 37 A1/63 B17 | 1.9 | 71 | 3.8 | 1512 | 190 | 1320 | 240 |
| M37 | 40 A1/60 B18 | 2.0 | 70 | 3.5 | 1388 | 331 | 829 | 299 |
| M38 | 37 A1/63 B18 | 1.9 | 69 | 4.3 | 1458 | 264 | 973 | 327 |
| M39 | 43 A1/57 B18 | 2.2 | 71 | 3.5 | 1545 | 257 | 983 | 267 |
| M40 | 40 A1/60 B19 | 2.0 | 72 | 4.7 | 1727 | 55 | 1224 | 199 |
| M41 | 37 A1/63 B19 | 1.9 | 71 | 5.1 | 1744 | 186 | 1134 | 243 |
| M42 | 40 A1/60 B20 | 2.0 | 74 | 3.5 | 1632 | 99 | 1428 | 92 |
| M43 | 37 A1/63 B20 | 1.9 | 74 | 3.3 | 1597 | 258 | 1215 | 274 |
| M44 | 43 A1/57 B20 | 2.2 | 75 | 3.3 | 1838 | 44 | 1597 | 67 |
| M45 | 40 A1/60 B21 | 2.0 | 75 | 3.4 | 1599 | 55 | 1456 | 149 |
| M46 | 37 A1/63 B21 | 1.9 | 71 | 3.7 | 1546 | 187 | 1401 | 226 |
| M47 | 43 A1/57 B21 | 2.2 | 72 | 3.5 | 1686 | 16 | 1434 | 58 |
| M48 | 32 A1/68 B24 | 1.6 | 70 | 3.9 | 1282 | 371 | 878 | 384 |
| M49 | 34 A1/66 B25 | 1.7 | 69 | 3.6 | 1291 | 291 | 972 | 303 |
| M50 | 36 A1/64 B24 | 1.8 | 70 | 3.5 | 1400 | 354 | 1071 | 304 |
| M51 | 38 A1/62 B25 | 1.9 | 70 | 3.5 | 1580 | 303 | 1033 | 330 |
| M52 | 40 A1/60 B24 | 2.0 | 71 | 3.5 | 1647 | 274 | 1110 | 301 |
| M53 | 42 A1/58 B25 | 1.9 | 72 | 3.1 | 1453 | 262 | 1107 | 163 |
| M54 | 32 A1/68 B22 | 1.6 | 71 | 3.7 | 1425 | 328 | 1141 | 264 |
| M55 | 34 A1/66 B23 | 1.7 | 71 | 4.0 | 1679 | 282 | 1221 | 136 |
| M56 | 36 A1/64 B22 | 1.8 | 71 | 3.7 | 1628 | 289 | 1312 | 302 |
| M57 | 38 A1/62 B23 | 1.9 | 73 | 3.7 | 1564 | 260 | 1298 | 201 |
| M58 | 40 A1/60 B22 | 2.0 | 72 | 3.2 | 1574 | 268 | 1345 | 231 |
| M59 | 42 A1/58 B23 | 1.9 | 72 | 3.8 | 1733 | 145 | 1354 | 84 |

The invention claimed is:

1. A mixture comprising
a) from 5 to 95% by weight of a copolymer A which comprises one or more copolymer blocks $(B/S)_A$ each composed of from 65 to 95% by weight of vinylaromatic monomers and from 35 to 5% by weight of dienes and of a glass transition temperature $Tg_A$ in the range from 40° to 90° C.,
b) from 95 to 5% by weight of a block copolymer B which comprises hard blocks S composed of from 95 to 100% by weight of vinylaromatic monomers and of from 0 to 5% by weight of dienes, and comprises one or more copolymer blocks $(B/S)_A$ each composed of from 65 to 95% by weight of vinylaromatic monomers and from 35 to 5% by weight of dienes and of a glass transition temperature $Tg_A$ in the range from 40° to 90° C., and comprises one or more copolymer blocks $(B/S)_B$ each composed of from 20 to 60% by weight of vinylaromatic monomers and of from 80 to 40% by weight of dienes and of a glass transition temperature $Tg_B$ in the range from −80° to 0° C., and wherein the hard blocks S of the block copolymer B occur terminally ($S_e$) or between ($S_i$) the copolymer blocks $(B/S)_A$ and $(B/S)_B$ and wherein the hard blocks S of the block copolymer B have a number average molar mass $M_n$ in the range from 5000 to 30,000 g/mol,
c) from 0 to 45% by weight of thermoplastic polymers C other than A and B, and
d) from 0 to 6% by weight of processing aids D,
where the entirety of A to D gives 100% by weight.

2. The mixture according to claim 1, which comprises
a) from 30 to 50% by weight of the copolymer A,
b) from 70 to 50% by weight of the block copolymer B, and
c) from 0 to 20% by weight of thermoplastic polymers C.

3. The mixture according to claim 1, wherein the weight-average molecular weight $M_w$ of the copolymer blocks $(B/S)_A$ of the block copolymer A is in the range from 150 000 to 300 000.

4. The mixture according to claim 1, wherein the glass transition temperature of the copolymer blocks $(B/S)_A$ of the block copolymers A and B is in the range from 50° to 80° C.

5. The mixture according to claim 1, wherein the copolymer A is composed of a copolymer block $(B/S)_A$ composed of from 85 to 93% by weight of styrene and from 7 to 15% by weight of butadiene.

6. The mixture according to claim 1, wherein the number-average molar mass $M_n$ of the copolymer blocks $(B/S)_B$ of the block copolymer B is from 10 000 to 40 000 g/mol.

7. The mixture according to claim 1, wherein the copolymer blocks $(B/S)_A$ and $(B/S)_B$ of the block copolymers A and B have random distribution of the vinylaromatic monomers and dienes.

8. The mixture according to claim 1, wherein the number-average molar mass $M_n$ of the hard blocks S of the block copolymer B is in the range from 5000 to 30 000 g/mol.

9. The mixture according to claim 1, wherein the block copolymer B has a star-shaped structure having terminal hard blocks $S_e$ and $(B/S)_A$, and the proportion of the entirety of all of the hard blocks S and $(B/S)_A$ is at least 40% by weight, based on the entire star-shaped block copolymer B.

10. The mixture according to claim 8, wherein the star of the star-shaped block copolymer B has in essence short branches of structure $S_e$-$(B/S)_B$ and long branches of structure $(B/S)_A$-$S_i$-$(B/S)_B$, linked by way of the soft blocks $(B/S)_B$.

11. A process comprising producing shrink films comprising the mixture according to claim 1.

12. A shrink film, produced from a mixture according to claim 1.

13. The mixture according to claim 2, wherein the weight-average molecular weight $M_w$ of the copolymer blocks $(B/S)_A$ of the block copolymer A is in the range from 150 000 to 300 000.

14. The mixture according to claim 2, wherein the glass transition temperature of the copolymer blocks $(B/S)_A$ of the block copolymers A and B is in the range from 50° to 80° C.

15. The mixture according to claim 3, wherein the glass transition temperature of the copolymer blocks $(B/S)_A$ of the block copolymers A and B is in the range from 50° to 80° C.

16. The mixture according to claim 2, wherein the copolymer A is composed of a copolymer block $(B/S)_A$ composed of from 85 to 93% by weight of styrene and from 7 to 15% by weight of butadiene.

17. The mixture according to claim 3, wherein the copolymer A is composed of a copolymer block $(B/S)_A$ composed of from 85 to 93% by weight of styrene and from 7 to 15% by weight of butadiene.

18. The mixture according to claim 4, wherein the copolymer A is composed of a copolymer block $(B/S)_A$ composed of from 85 to 93% by weight of styrene and from 7 to 15% by weight of butadiene.

19. The mixture according to claim 2, wherein the number-average molar mass $M_n$ of the copolymer blocks $(B/S)_B$ of the block copolymer B is from 10 000 to 40 000 g/mol.

20. The mixture according to claim 3, wherein the number-average molar mass $M_n$ of the copolymer blocks $(B/S)_B$ of the block copolymer B is from 10 000 to 40 000 g/mol.

* * * * *